E. C. WOOD.
METHOD FOR INDICATING A SHIP'S APPROACH AND MEANS THEREFOR.
APPLICATION FILED DEC. 11, 1912.
1,150,799.
Patented Aug. 17, 1915.
2 SHEETS—SHEET 1.
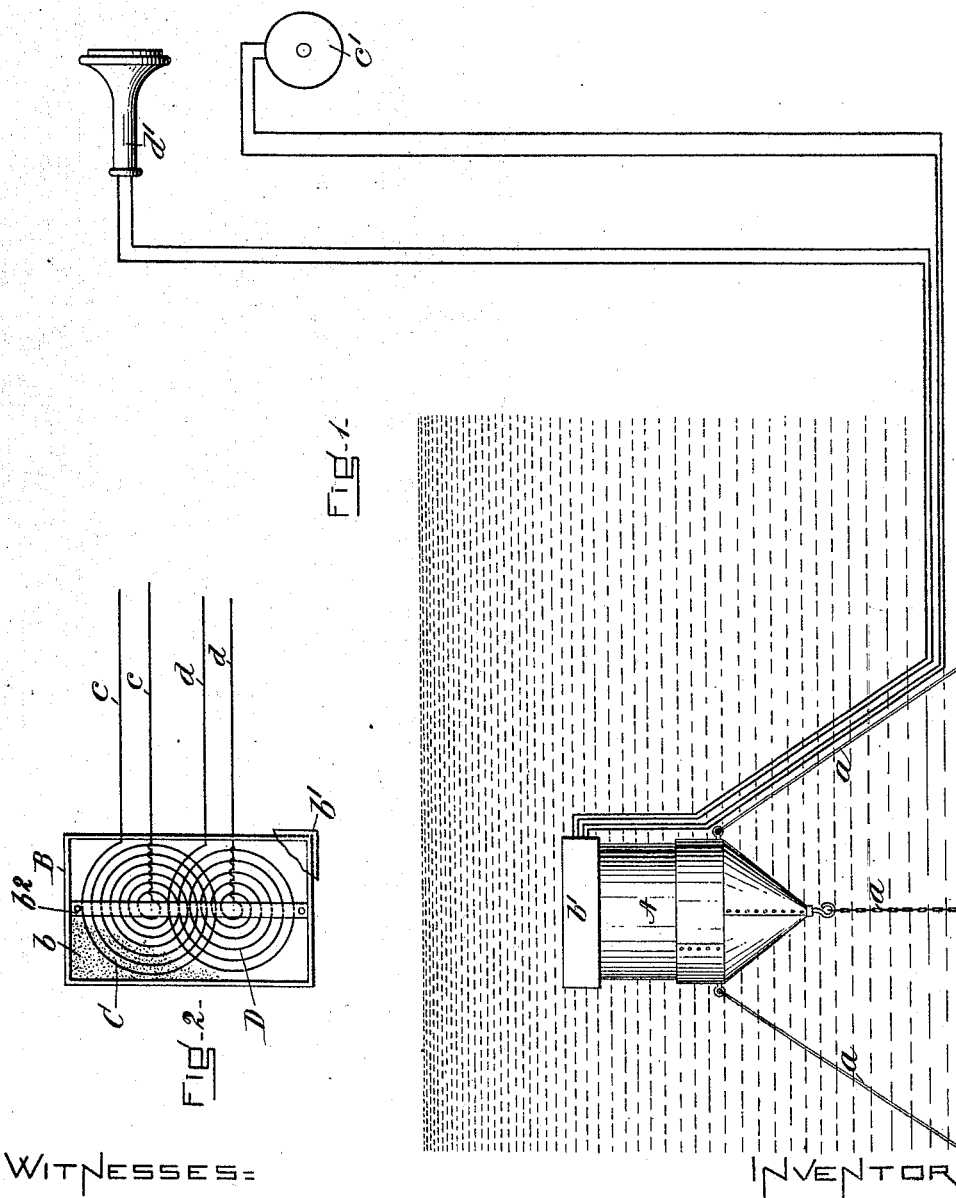

E. C. WOOD.
METHOD FOR INDICATING A SHIP'S APPROACH AND MEANS THEREFOR.
APPLICATION FILED DEC. 11, 1912.
1,150,799.
Patented Aug. 17, 1915.
2 SHEETS—SHEET 2.
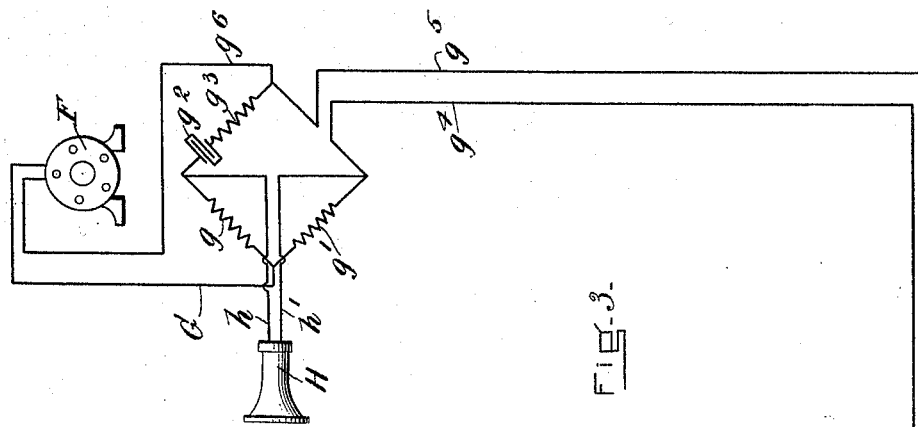
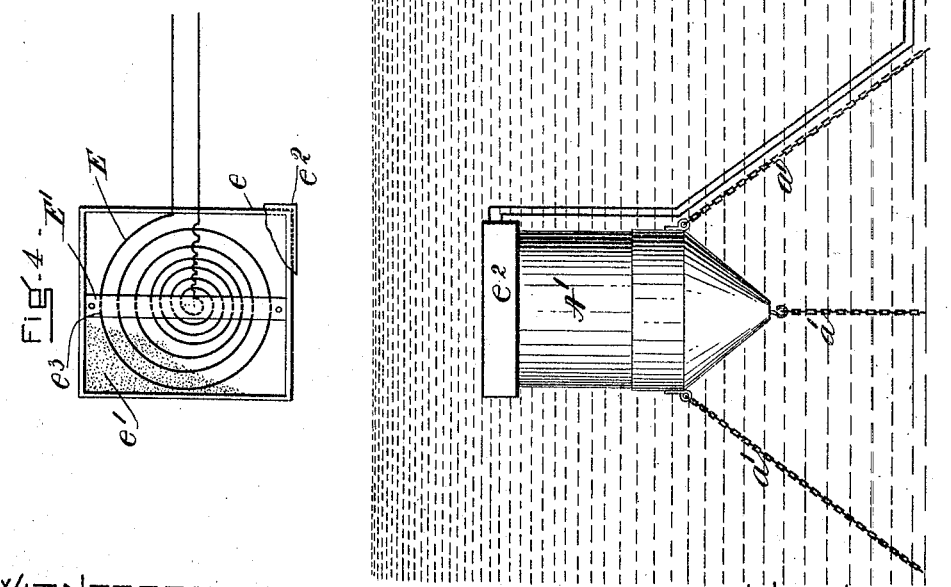
WITNESSES:
M. E. Flaherty.
A. E. O'Brien.
INVENTOR:
Edward C. Wood
By
his attorneys.

UNITED STATES PATENT OFFICE.

EDWARD C. WOOD, OF SOMERVILLE, MASSACHUSETTS, ASSIGNOR TO SUBMARINE SIGNAL COMPANY, OF WATERVILLE, MAINE, A CORPORATION OF MAINE.

METHOD FOR INDICATING A SHIP'S APPROACH AND MEANS THEREFOR.

1,150,799.   Specification of Letters Patent.   Patented Aug. 17, 1915.

Application filed December 11, 1912. Serial No. 736,215.

*To all whom it may concern:*

Be it known that I, EDWARD C. WOOD, of Somerville, in the county of Middlesex and State of Massachusetts, a citizen of the United States, have invented a new and useful Improvement in Methods for Indicating a Ship's Approach and Means Therefor, of which the following is a specification.

My invention is intended more especially as a guard to a ship's channel for use in time of war when it is desired that early notice of the approach of a hostile ship in the night time or during a fog should be received. It is equally applicable, however, under certain conditions for use at other times.

It comprises a method of signaling by the introduction of a disturbing element into a magnetic field of considerable force established at a point sufficiently below the surface of the water not to be interfered with by contact with incoming or outgoing vessels.

The field may be established by means of coils placed in overlapping position, one coil being connected to an alternating generator or in a circuit in which the current is interrupted, the other coil containing a signaling instrument, or the field itself may be established in the arm of a circuit balanced under normal conditions by capacity and impedance and bridged by a signaling instrument of such character that upon the disturbing of the magnetic field a visual or audible signal will be given. In either case the coil from which the magnetic field originates as below described is preferably mounted upon a buoy or other submerged object anchored at a proper distance below the surface of the water, and in the form of my invention herein specifically described is connected with an alternating generator. When a balanced circuit is used the arms of the balanced circuit contain resistances and a condenser adjusted as to resistance and capacity and are connected by a bridge containing some signaling instrument, for example, a telephone receiver.

My invention will be understood by reference to the drawings in which two forms of apparatus are shown mainly diagrammatically by which my invention may be practised.

Figure 1 is an elevation of a submerged buoy carrying the field-producing coils, the connections being shown diagrammatically. Fig. 2 is a plan of the coil box, the cover being removed. Fig. 3 shows another form of apparatus for carrying out my method, Fig. 4 being a plan of the coil.

In Figs. 1 and 2 A is the buoy suitably anchored a proper distance below the water line by a chain and cables $a$. B is the coil box in which are contained coils C and D. These coils are preferably of insulated wire preferably embedded in insulating material $b$ such for example as the well known material called ozite and the box when closed is covered with india rubber $b^1$ or other like material to form a watertight casing without affecting the magnetic conditions. A crossbar $b^2$ holds the coils in place in the box. The coil C is connected by insulated wires $c$ with an alternating generator $c^1$ and the coil D is connected by insulated wires $d$ with a telephone receiver or other indicator $d^1$.

In preparing the apparatus for use the coils are adjusted with relation to each other so as to form an induction balance, that is to say, the coil C carries the current from the generator $c^1$. The coil D is adjusted in the magnetic field of C in such relation thereto that there is no potential across the terminals of coil D. The field so formed, however, will be distorted by the entry therein of an armored vessel and the balance will no longer exist so that a current will be established in the circuit of coil D sufficient to give a signal at the signaling instrument $d^1$.

In Figs. 3 and 4 $A^1$ is the buoy, $a^1$ being the chains by which the buoy is anchored. The buoy as before should be located sufficiently below the surface of the water according to the draft of the ships which the channel can accommodate in order that it will not be interfered with by the passing of ships.

The coil E is of insulated wire and is preferably packed in a box $e$ and embedded in ozite $e^1$ or some other insulator, the box itself being covered with india rubber $e^2$ or other like material to prevent the leakage of water into the box. A crossbar $e^3$ holds the coil in place.

F is an alternating generator of any ordinary construction one of the terminals of which is connected by a wire G with a balanced circuit in two arms of which are resistances $g$, $g^1$, respectively. The resistance $g$ is connected with a condenser $g^2$ and an inductive resistance $g^3$ which forms a third arm, the fourth arm being the coil E and its insulated connections $g^4$, $g^5$. The circuit is completed to the generator F by the wire $g^6$.

A bridge carrying a telephone receiver or other suitable indicator H completes the construction, one member of the bridge $h$ connecting the indicator H between the resistance $g$ and the condenser $g^2$, the other member of the bridge $h^1$ being connected to the balance between the resistance $g^1$ and the wire $g^4$.

In operation the resistances and the condenser in the Wheatstone bridge construction are first so adjusted with relation to the impedance and capacity of the coil E and its connections $g^4$, $g^5$ that the circuit is balanced as is indicated by the indicator H which, if a telephone receiver is used, is silent. So long as this condition continues it will be known that no ship is in the neighborhood. When, however, a battle ship or any other ship having a considerable quantity of iron or steel in its construction or as cargo or ballast, approaches the coil E, the lines of magnetic force originating from the coil are disturbed and the result is that the bridge becomes unbalanced and a signal of some character will be given at H by a buzzing or other sound, if a telephone receiver is used.

The apparatus shown in the drawings and above described are simple forms of construction by which the desired result may be secured. Those skilled in the art will readily suggest modifications either in the signaling or other portions of the apparatus whereby an indication of a disturbance of the magnetic situation may be identified. For example, a rapidly interrupted current of sufficient strength may be used to secure the magnetic field instead of an alternating current.

By means of this method a narrow ship's channel may be guarded, or if the channel be wide a number of magnetic fields may be used, each with its own signaling instrument and bridge, so that if the channel be properly charted the exact position of the approaching ship will be indicated because of the signaling circuit effected.

It is of course understood that the source of electricity and the signaling instrument should be located on shore or at a suitable station on board a vessel.

What I claim as my invention is:—

1. That method of submarine signaling which consists in disturbing a submerged electrically-generated magnetic field by the approach thereto of a body of magnetic metal whereby the electric current forming the source of said field will be disturbed, and causing the disturbance of said electric current to influence an indicating instrument.

2. That method of submarine signaling which consists in disturbing a submerged electrically-generated magnetic field by the approach thereto of a body of magnetic metal and influencing by such disturbance an electric current passing through an indicating instrument whereby said indicating instrument will respond to such disturbance.

3. In combination, two independent circuits, one containing a generator and the other a signaling instrument and each containing a coil, said coils being arranged in overlapping and balanced relation to each other whereby upon the disturbing of the magnetic field of the generator circuit coil a signal will be given by the signaling instrument.

EDWARD C. WOOD.

Witnesses:
EDWIN O. G. CREW,
M. E. FLAHERTY.